United States Patent [19]

Berkoff

[11] Patent Number: 5,435,648
[45] Date of Patent: Jul. 25, 1995

[54] REUSABLE POPCORN POPPING CONTAINER

[76] Inventor: William Berkoff, 6143 W. Olympic Blvd., Los Angeles, Calif. 90048

[21] Appl. No.: 288,835

[22] Filed: Aug. 11, 1994

Related U.S. Application Data

[63] Continuation-in-part of Ser. No. 126,903, Sep. 24, 1993, abandoned.

[51] Int. Cl.6 .................. B65D 33/30; B65D 30/20
[52] U.S. Cl. ........................ 383/90; 383/68; 383/89; 383/120
[58] Field of Search ............... 383/82, 83, 88, 89, 383/90, 68, 69, 85, 120; 426/234, 111, 107

[56] References Cited

U.S. PATENT DOCUMENTS

| | | | |
|---|---|---|---|
| 1,291,974 | 1/1919 | McNeil | 383/89 |
| 2,021,609 | 11/1935 | Pippert | 383/90 X |
| 2,319,316 | 5/1943 | Gerendas | 383/68 X |
| 3,381,883 | 5/1968 | Harris | 383/69 X |
| 3,446,420 | 5/1969 | Rinecker | 383/89 |
| 4,071,186 | 1/1978 | Ruda | 383/89 |
| 5,003,142 | 3/1991 | Fuller | 426/107 X |

FOREIGN PATENT DOCUMENTS

| | | | |
|---|---|---|---|
| 423018 | 5/1948 | Italy | 383/90 |
| 615876 | 2/1980 | Switzerland | 383/90 |

Primary Examiner—Allan N. Shoap
Assistant Examiner—Jes F. Pascua
Attorney, Agent, or Firm—Erik M. Arnhem

[57] ABSTRACT

A reusable bag system for use in popping popcorn kernels is a microwave oven. The system provides a foldable bag having front and rear walls joined by foldable side walls, a closed bottom wall, and an open mouth. The bag is closeable by double folding the bag over in its mouth region. Creased lines separated from one another by one-half inch from the open mouth on the front and rear walls of the bag aid the user in accurately double folding the mouth region closed. The system uses a microwave safe plastic closure clip having two spaced apart side walls joined at their upper region, and having inwardly directed pressure exerting ridges to air-tightly close the bag. Unpopped kernels are placed in the bag and sealed therein. To use the bag system, the consumer places popcorn kernels into the bag through its open mouth and folds over the mouth region of the bag to thereby close the bag; the closure clip is installed on the folded-over mouth region to thereby air-tightly close the bag with the popcorn kernels inside.

1 Claim, 2 Drawing Sheets

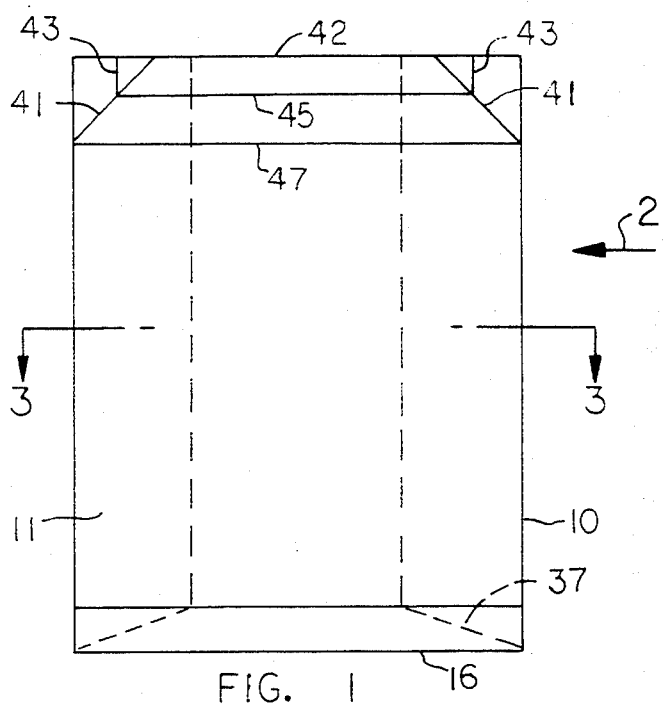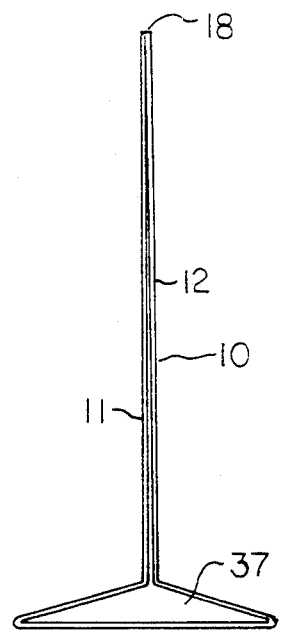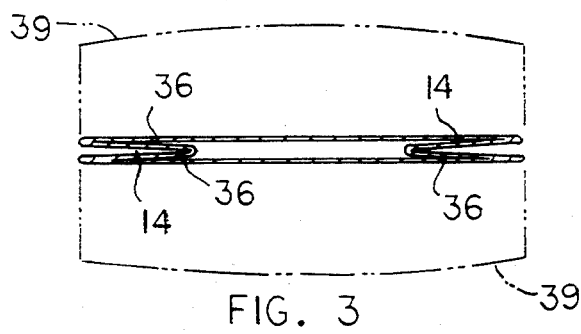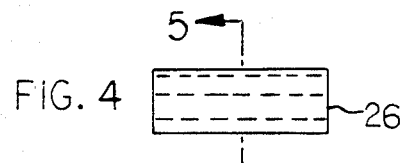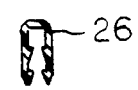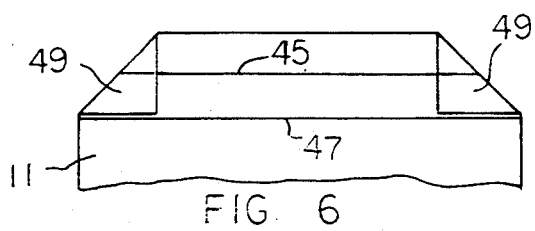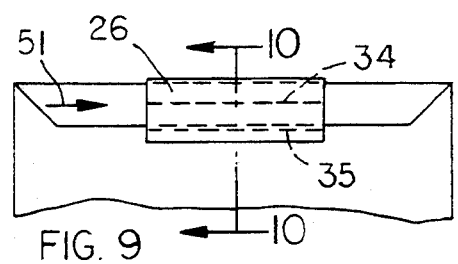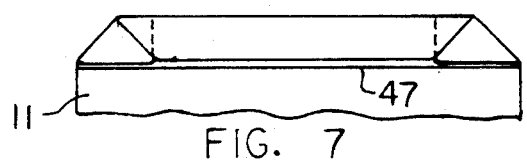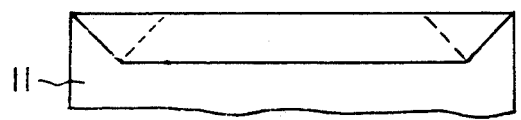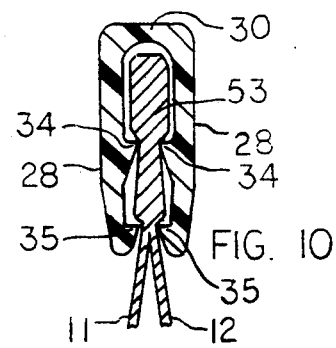

REUSABLE POPCORN POPPING CONTAINER

CROSS REFERENCE TO RELATED PATENT APPLICATION

This application is a continuation-in-part of my co-pending patent application Ser. No. 126,903, filed on Sep. 24, 1993, now abandoned.

BACKGROUND OF THE INVENTION

1. Field of the Invention—This invention relates to containers for popping corn, especially containers that can be placed in microwave ovens for popping kernels of popcorn located within the containers.

2. Prior Developments—There are numerous patents on popcorn bags, including U.S. Pat. Nos. 4,735,513, 4,691,374, 4,548,826, 4,450,180. However, the prior art microwave oven popcorn popping bag are sold with popcorn kernels already contained inside the bag, which is glued shut. The popcorn kernels are often coated with oil to aid in the popping process, and also seasoned and thus subject to rancidity. The oil (usually hydrogenerated), especially in a warm atmosphere prior to microwaving, tends to leak through walls of the bag, giving the bag a greasy feel, and requiring that the individual bags be wrapped with a plastic overlay. Because of the oil and the gluing of the bags, the prior art bags are not reusable; also often the glue will release during microwaving process and permeate into the popcorn. Furthermore, most present day microwave popcorn bags incorporate a plastic metalized heat-susceptor to help meltdown hydrogenerated oil to coat season ,the popcorn content. In this context, the concept of my newly invented popcorn bag will eliminate the need of heat-boosting susceptors in order to attain a volume of quality popped corn.

In terms of popcorn freshness and economy the consumer has little control over the freshness of popcorn being popped in conventional microwave popcorn bags, and especially those which may have been on the shelf for an undetermined period. Also consumers pay a premium for the extra packaging.

Another problem with the prior art popping bags is that they tend to become piping hot, which not only make them dangerous to remove from the microwave oven, but also tend to scorch some of the popcorn inside the bags.

There are many patents in the field of containers which are closed by clips. U.S. Pat. Nos. 4,498,585, 3,693,864, 3,680,771, 3,458,110, 3,381,883 and 2,533,539 disclose resealable cartons which use clips to seal their open mouths. U.S. Pat. Nos. 3,141,221, 3,086,264, 2,586,931, 2,338,927, 2,021,609 and 1,590,682 disclose various clip designs which can be used to close paper bags and the like. The 3,096,264 and 2,021,609 patents disclose a clip to be slid over a folded cover area of a bag. No one, however, has used a plastic clip in conjunction with a reusable paper bag to retain popcorn kernels therein during microwave oven popping. Also, no one for commercial purposes has created a double-folded bag for popping popcorn successfully.

There is accordingly a need for a microwave popcorn popping bag which safe to handle, allows the user to use his or her own fresh popcorn kernels, and is cost effective.

SUMMARY OF THE INVENTION

The invention herein provides a reusable container for use in popping popcorn kernels in a microwave oven, comprising:

a foldable paper bag having front and rear walls joined by foldable side walls, a closed bottom wall and open mouth, said bag being closeable by double folding the bag over in its mouth region; and the using of a short length microwave safe plastic closure clip having two spaced apart side walls joined at their upper region, and having inwardly directed pressure exerting ridges.

Wherein to use the bag system, the consumer will place popcorn kernels into the bag through its open mouth, double-fold the mouth region to correspond with crease lines and printed instructions. Upon closing the bag accordingly, the clip is slidably installed on, the folded mouth portion of the bag, thereby causing the bag to be sealed air-tight, with the popcorn kernels inside. When the sealed kernel-filled bag is placed in a microwave oven at the recommended temperature, the bag rapidly inflates to a balloon-like form, causing the gaseous vapors emanating from the kernels to pop the latter profusely to completion. Thereafter, the bag is safely removed from the oven, after which the clip is removed from the bag by conveniently being slid off to gain access to popped popcorn inside the bag.

IN THE DRAWINGS

FIG. 1, is a front elevational view of a reusable microwave popcorn popping bag of the invention in its flattened, unexpanded form.

FIG. 2, is a side elevational view of the FIG. 1, bag taken in the direction of arrow 2 in FIG. 1.

FIG. 3, is a sectional view of the FIG. 1 bag, taken along line 3—3 in FIG. 1.

FIG. 4, is a front elevational view of a plastic clip used to retain the FIG. 1, bag in a sealed closed condition during a popcorn popping operation.

FIG. 5, is a sectional view of the FIG. 4 clip taken on line 5—5 in FIG. 4.

FIG. 6, is a fragmentary elevational view take with the bag in a folded condition.

FIG. 7, is a fragmentary elevational view of the FIG. 1 bag, taken after a further bag-folding operation.

FIG. 8, is another fragmentary elevational view of the FIG. 1 bag, taken after another bag-folding operation.

FIG. 9, is a fragmentary front elevational view of the FIG. 1, bag, folded and sealed shut with the clip depicted in FIGS. 4 and 5.

FIG. 10, is a fragmentary enlarged cross sectional view taken on line 10—10 in FIG. 9.

DETAILED DESCRIPTION OF A PREFERRED EMBODIMENT OF THE INVENTION

Figure 12:
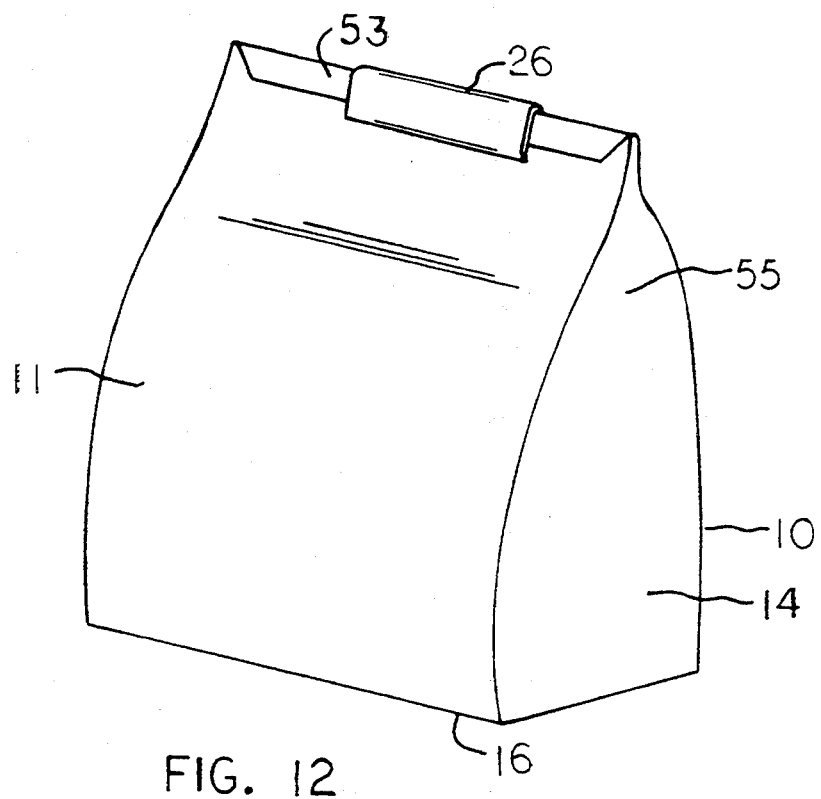
FIG. 12, is a perspective view of the FIG. 1 bag, taken with the bag in an inflated condition.

Referring to FIGS. 1-3, there is shown a foldable microwave popping bag 10 of the invention. The bag has a front wall 11, a rear wall 12, two side walls 14, and a rectangular bottom wall 16. Each side wall 14 comprises two side wall sections hingedly connected to each other and to the associated front and rear walls, whereby the side wall sections have collapsed positions extending parallel to walls 11 and 12, and expanded positions extending normal to walls 11 and 12. Each side wall 14 includes a triangular section 37 connected to an end edge of bottom wall 16, to enable the side wall sections to expand or collapse without tearing the bag walls.

FIG. 3, is a cross sectional view showing the bag walls 11, 12 and 14 in the collapsed condition of side wall 14; side wall sections 36 are shown folded or collapsed together so as to be generally parallel to front wall 11 and rear wall 12. Dashed lines 39 are included in FIG. 3 to show the cross sectional outline of the bag with side walls 14 in the expanded condition.

FIG. 2, is a side elevational view of the bag in the collapsed condition. The front and rear walls 11 and 12 are creased, as at 40, to facilitate manual folding of the bag in its collapsed condition. The bag is preferably formed of a single sheet of two ply material. The inner ply is paper, and the outer ply is a thin lamination of plastic.

FIGS. 9 and 10 show the bag sealed shut by a U-shaped plastic clip 26. Prior to installation of the clip onto the bag the upper portions of the bag walls 11, 12 and 14 are folded a number of times to provide a labyrinth seal at the upper mouth area of the bag. Clip 26 is designed to grip the folded portions of the bag, to prevent such unfolding of the bag walls as might destroy the seal at the mouth of the bag. FIGS. 6 through 9 illustrate various folding operations performed on the bag walls prior to installation of clip 26.

Figure 11:
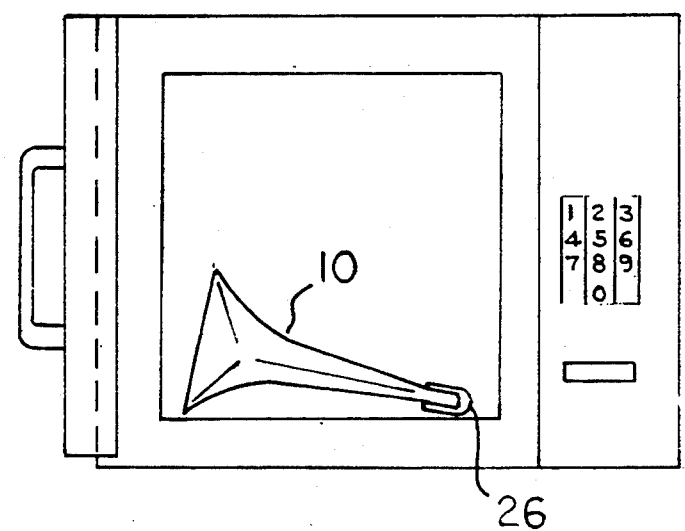
FIG. 11, shows the FIG. 1 bag placed in a microwave oven prior to a popcorn popping operation.

Prior to the above-mentioned bag-folding operations a quantity of unpopped kernels of popcorn is placed in bag 10. After the bag has been closed and sealed shut with clip 26, the bag is placed in a microwave oven, as shown e.g. in FIG. 11. The microwave oven is turned on for a predetermined time, or until the popcorn kernels have substantially stopped popping. The cooking (or popping) time will vary according to the quantity of kernels initially placed in the bag. With approximately one fourth cup of kernels contained in the bag, the popping time is about three minutes.

The present invention is concerned primarily with a folding procedure or mechanism used to seal the upper mouth of the bag in a closed condition, after placement of the unpopped kernels in the bag. FIGS. 6 through 9 illustrate the bag in various stages during the folding operations.

Referring to FIG. 1, the upper portions of the bag walls 11, 12 and 14 are formed with diagonal creases 41 extending from the bag upper edge 42 to the edges of walls 11 and 12. FIG. 1 shows diagonal creases 41 in wall 11; similar creases are formed in walls 12 and 14 (directly behind creases 41 in FIG. 1).

A short crease 43 extends downwardly from the upper edge of each wall 11, 12 and 14, to intersect the associated diagonal crease 41.

A second set of creases 45 extends in walls 11, 12 and 14 parallel to the bag upper edge 42. Typically, creases 45 are located about one-half inch below the bag upper edge 42.

A third set of creases 47 extend in walls 11, 12 and 14 parallel to creases 45. Creases 47 are, typically spaced slightly more than one inch below the bag upper edge 42.

The bag is subjected to three folding operations prior to installation of clip 26. FIG. 6 shows the condition of the bag after the first folding operation. The bag is folded along diagonal creases 41 so that triangular sections 49 of the bag walls lie against bag front wall 11.

In FIG. 6, the creases 45 and 47 show the horizontal folding lines of the bag; triangular sections 49 constitutes the diagonal fold-down corner creases, effectively creating the air-tight corners prior to double folding the creases 45 and 47. Following this sequence, an overall air-tight bag is achieved, preventing the escape of heated air when microwaving popcorn.

FIG. 7 shows the condition of the bag after a second folding operation. The upper edge sections of walls 11 and 12 are folded along crease lines 45 to lie against the bag front wall and partially cover the triangular sections 49. FIG. 8 shows the condition of the bag after a third folding operation. The upper areas of walls 11 and 12 are folded along crease lines 47 to lie against the bag front wall and fully cover the triangular sections 49. FIGS. 8 and 9 show the final condition of the folded bag (after the three folding operations). FIG. 9 shows the bag with the clip 26 installed on the folded portion of the bag. The clip is installed with a horizontal sliding motion, as indicated by directional arrow 51 in FIG. 9.

The bag-folding operation advantageously provides an air-tight seal along the mouth of the bag, in that triangular wall sections 49 are fully enclosed within the folded areas of the bag. No air can escape from the bag through the ends of the bag mouth. Clip 26 holds the folded areas of the bag closed against unfolding.

As best shown in FIG. 10, clip 26 comprises a web 30 and two spaced side walls 28; the spacing of walls 28 is slightly greater than the thickness of the folded area of the bag is designated by numeral 53.

The clip side walls 28 have two sets of facing ridges 34 and 35 spaced different distances from web 30. When the clip is slidably inserted onto the folded area of the bag, ridges 34 exert a squeezing pressure at intermediate points along the folded area 53, e.g. about one quarter inch below the upper edge of the bag; ridges 35 exert a squeezing pressure on walls 12 below the folded area 53. Ridges 53 will be spaced apart a slightly lesser distance than ridges 34 to compensate for thickness differences in bag material being gripped by the respective ridges.

The pressure-applying ridges 34 and 35 individually grip the bag walls to augment or enhance the sealing action provided by the bag-folding operations (depicted in FIG. 6 through 8).

FIG. 12 shows the bag after a popcorn popping operation, i.e. after removal from the microwave oven. It will be seen from FIG. 12 that clip 26 has a length dimension that is substantially less than the corresponding transverse bag dimension measured along the upper edge of bag front wall 11. This is beneficial in that the exposed sections of the bag folded material not covered by the clip 26 can expand or unwind slightly, such that the upper portions 55 of the bag side walls can balloon out, in accordance with internal gaseous pressures generated within the bag during the microwave popping operation.

Typically the bag will be constructed to have a height of about eight inches and a width of about six inches (measured along walls 11 and 12). Clip 26 will have a length of about two or three inches. The consumer carries out a corn-popping operation by placing a predetermined amount of popcorn kernels in the bag 10, folding its top region over, and sealing the bag top region with the closure clip 26. The loaded bag 10 is placed in the microwave oven, and the oven is turned on. As the popcorn kernels begin to heat and pop, the internal space within the bag 10 will fill with heated vapors; the bag 10 will expand easily and quickly, thereby allowing the individual popcorn kernels to "air pop." After the popcorn kernels are popped, the bag 10 can be immediately picked up and removed from the microwave oven by the user grasping either corner of the bag where coolest, then momentarily sliding off closure clip 26 to open bag and evacuate popcorn in a safe hazard-free manner.

If desired, the consumer may reuse the bag 10 and closure clip 26 repeatedly, thus conserving expenses. The fact that the bags 10 can be provided without popcorn kernels, oiled or unoiled contained therein; allows the bags 10 to be sold in multiple packs, without requiring plastic wrapping enveloping each individual bag 10. This feature further adds to the economy of the popcorn popping bags 10. Allowing the consumer to use the popcorn kernels of his or her choice further ensures freshness, wholesomeness, and economy of the resulting popped popcorn. Alternatively, the bag system can be sold preloaded with unoiled popcorn kernels, and the bag system reused if desired.

It will be seen from FIGS. 2 and 12 of the drawings that the bag has a relatively small enclosed volume prior to the corn-popping operation. This is advantageous in that a relatively small quantity of heat needs to be generated in order to achieve a corn-popping operation. The heated vapors released from the corn kernels can be used to heat and expand the kernels, instead of merely heating air contained within the bag.

The length of clip 26 is another advantageous feature. By making clip 26 with a length less than the corresponding width dimension of bag front wall 11, the clip does not exert compressive forces on the end areas of bag folded areas 53. Such end areas can unwind slightly to permit portions 55 of side walls 14 to balloon outwardly during the corn popping operation. The kernels can interact with the heated vapors to achieve a large percentage of popped kernels.

In many cases the ballooning of wall portions 55 may not be important. However, if the consumer loads the bag more than the recommended quantity of corn kernels, the extra bag volume can be helpful in achieving a good percentage of popped kernels.

The consequence of the structural design herein eliminates a conventional gluing or sealing of a microwave Corn Popping Bag air-tight without using adhesives. Instead, bag is graphically illustrated to "crease corners and double-fold" at top opening and then secured by a short center clip as mentioned in claim 2. Consequently, after microwaving and evacuating popcorn, bag may be used over again, whereas bag has not been damaged or defaced as a tightly glued bag would be.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following the claims which follow.

What is claimed is:

1. A reusable container for use in popping popcorn in a microwave oven, comprising:

a bag formed of flexible material transparent to microwaves; said bag comprising a rectangular bottom wall, a rectangular upstanding front wall, a rectangular upstanding rear wall, and two upstanding side walls joined to said bottom wall;

each said side wall comprising two side wall sections hingedly connected to each other and to the associated front and rear walls, whereby said side wall sections have collapsed positions extending parallel to the front and rear walls and expanded positions extending normal to said front and rear walls;

said front wall, rear wall and side walls having upper edges located in a common plane, to form four bag corners and a bag mouth;

said front wall, rear wall, and side walls having a first set of creases extending diagonally across the bag corners when said side wall sections are in their collapsed positions, whereby triangular sections of the upstanding walls can be folded along said first set of creases to lie against the bag front wall;

said front wall and said rear wall having a second set of creases extending parallel to the bag upper edges, whereby said front and rear walls can be folded along said second set of creases to lie against the bag front wall and partially cover said triangular sections;

said front and rear walls having a third set of creases extending parallel to the bag upper edges below the second set of creases, whereby said front and rear walls can be folded along said third set of creases to lie against the bag front wall and fully cover said triangular sections;

and a U-shaped plastic clip having a web and two spaced side walls joined to said web, whereby said U-shaped clip can be slidably inserted onto the folded portions of the bag walls in a direction parallel to said second and third sets of creases; said clip side walls having two sets of facing ridges adapted to exert pressure on the bag walls; one set of ridges being located to exert pressure on the folded areas of bag walls; the other set of ridges being located to exert pressure below the folded areas of the bag walls;

said bag being adapted to contain a quantity of unpopped popcorn kernels, whereby said clip can then be slidably installed onto the bag to seal the bag when the bag is placed in a microwave oven to achieve the corn popping operation;

said clip having a length dimension that is substantially less than the bag dimension measured along the upper edges of the bag front and rear walls, whereby upper areas of the bag side walls can be expanded by heated air trapped in the bag during a corn popping operation in a microwave oven.

* * * * *